Inventor:
HANS VIESSMANN
BY Kurt Kelman
Agent

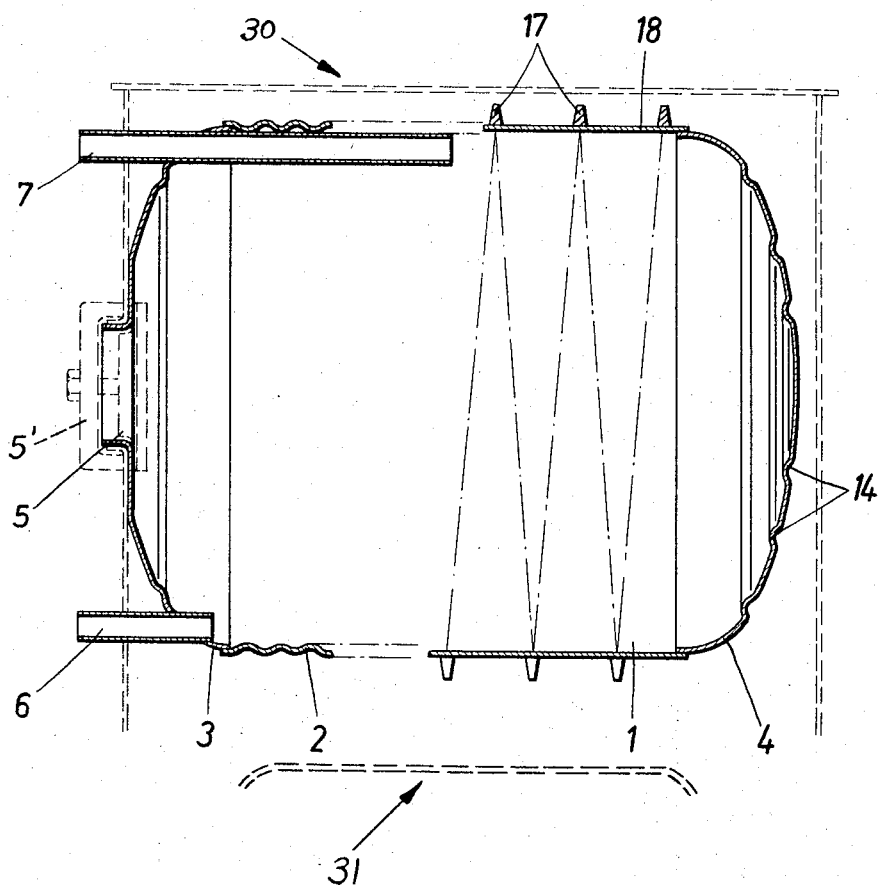

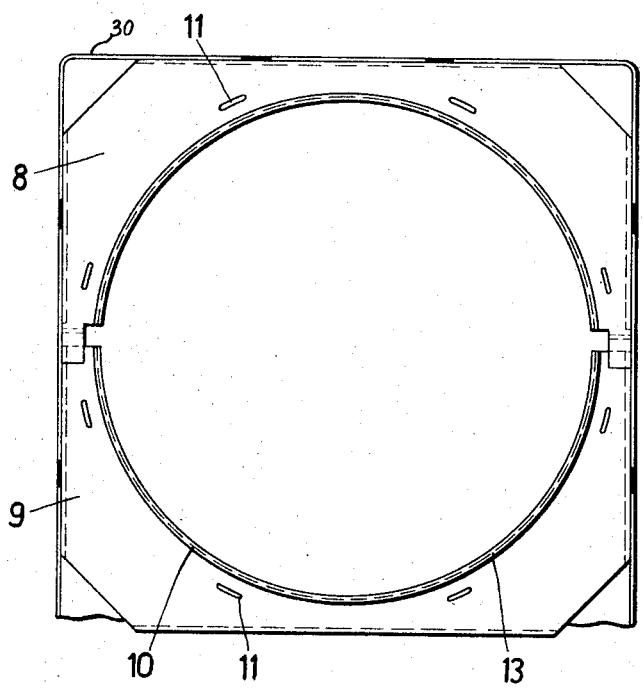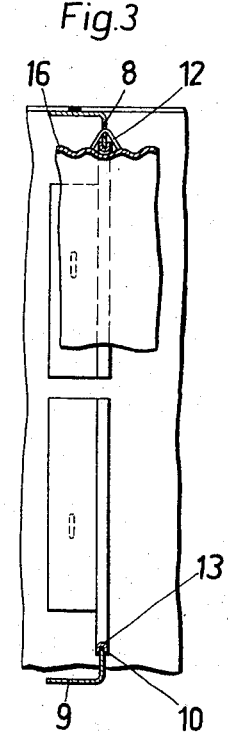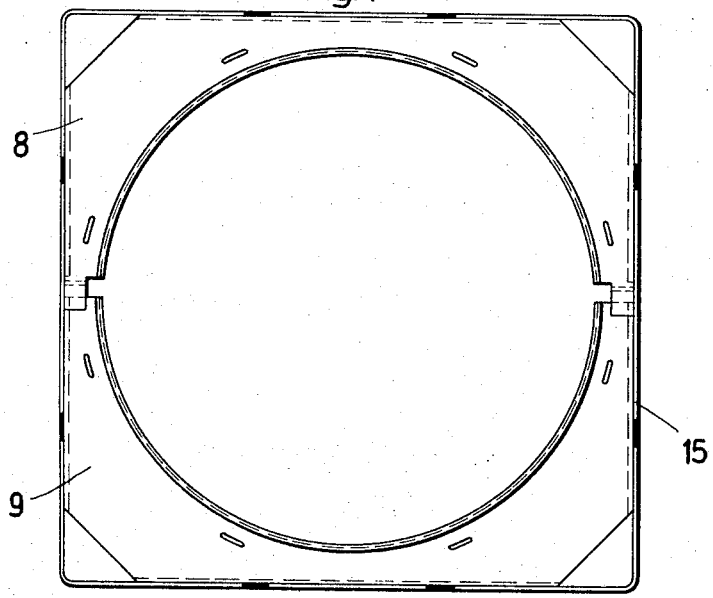

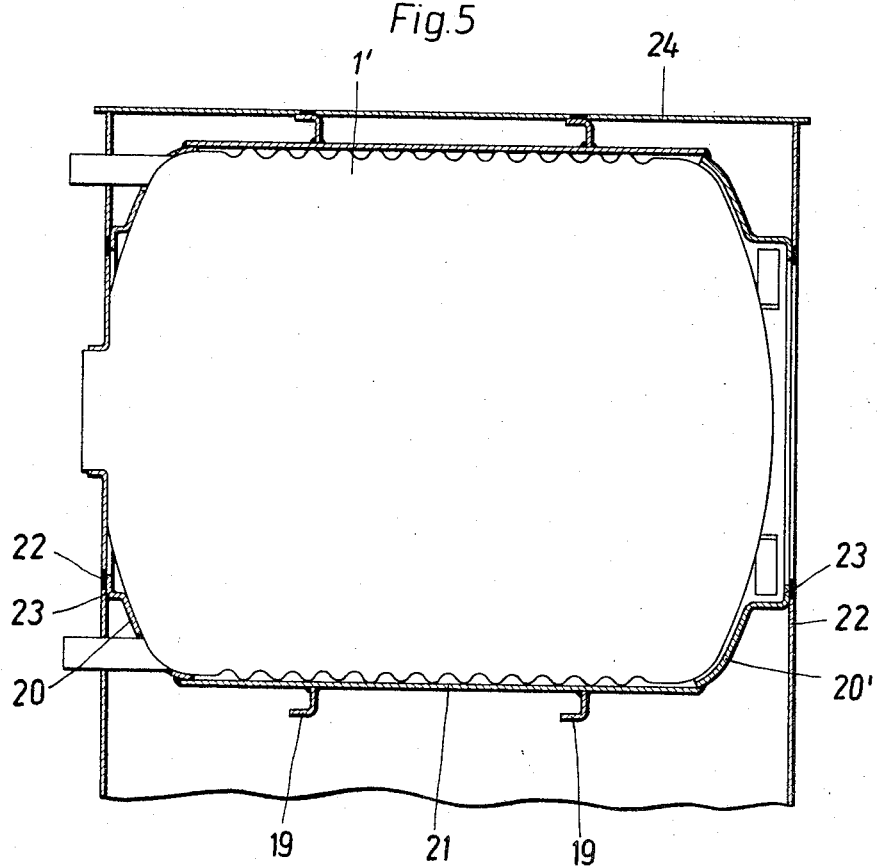

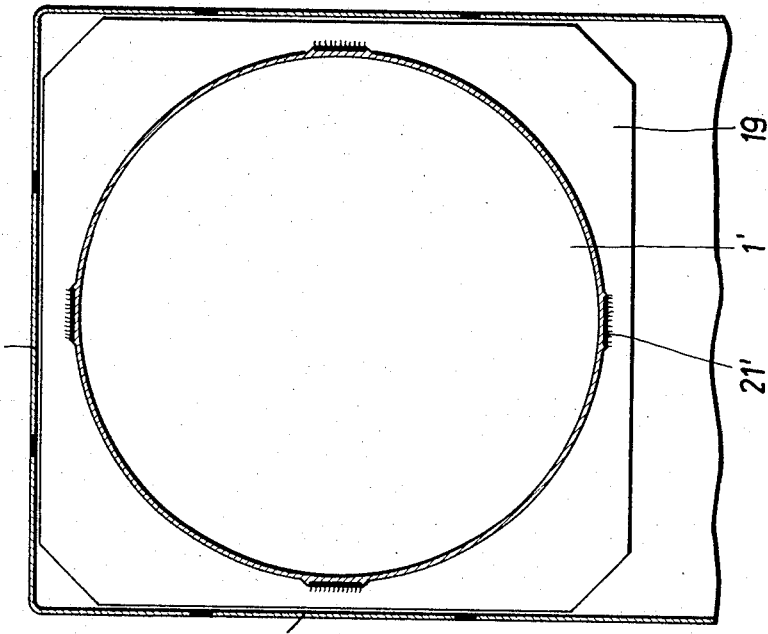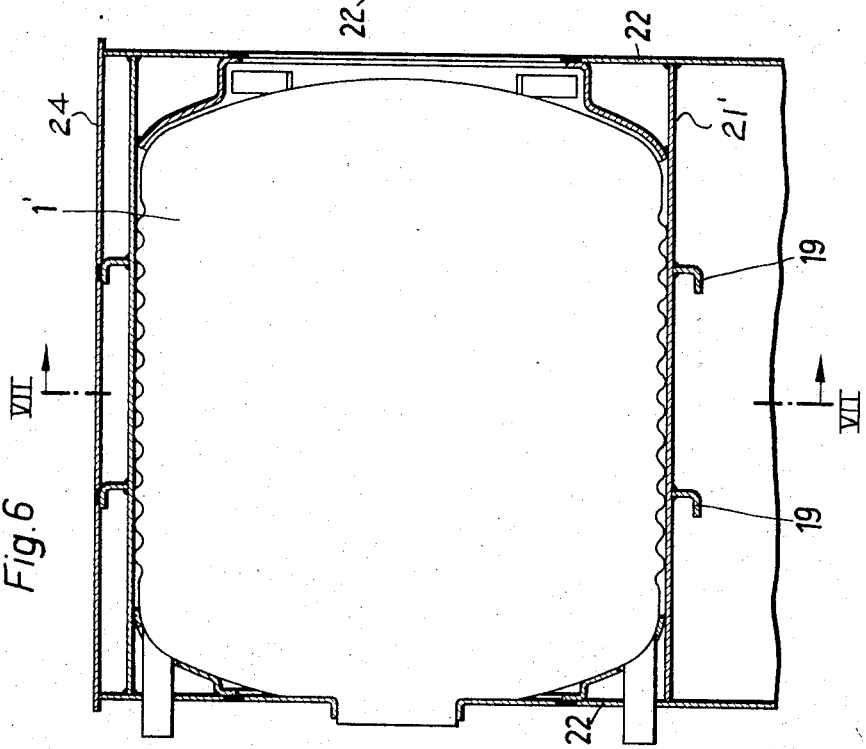

Inventor:
HANS VIESSMANN
BY Kurt Kelman
Agent

United States Patent Office 3,366,094
Patented Jan. 30, 1968

3,366,094
WATER HEATING APPARATUS
Hans Viessmann, Im Hain, Battenberg
(Eder), Germany
Filed Nov. 12, 1965, Ser. No. 507,491
Claims priority, application Switzerland, Dec. 24, 1964,
16,663/64; Germany, May 8, 1965, V 28,413
12 Claims. (Cl. 122—494)

ABSTRACT OF THE DISCLOSURE

A thin-walled tank having a water inlet and outlet, positioned inside a boiler and supported in position by a frame including annular members which surround the tank and strap members which connect the annular members. The tank is capable of limited movement relative to the annular members under expansion and contraction. Heating conduits may be provided in the tank, with open ends of the conduits at the tank walls permitting circulation of boiler fluid through the conduits.

---

This invention relates to water heating apparatus, and particularly to a hot-water supply operated in conjunction with a hot-water or steam heating system.

It is known to arrange water-heating tanks of heat-conductive material within the heated space of a steam or water boiler which supplies a heating system with heating fluid. It is also known to arrange coiled water-heating tubes in the same manner. The tanks as employed heretofore have a high peak capacity for furnishing hot water, but low capacity at continuous water flow, and the coiled tubes have high capacity at continuous water flow, but low peak capacity.

The coiled tubes require a relatively small amount of material of construction so that it is practical to make them of relatively costly copper or copper alloys which have high corrosion resistance. The amount of material required to build a conventional heating tank of adequate strength is sufficiently great to make the use of costly metal unattractive. In hard-water areas, however, the heating tubes tend to accumulate internal coatings of waterborne mineral materials which not only interfere with heat transmission but also reduce the rate of water flow at a fixed supply pressure.

The general object of the invention is the provision of a water heating apparatus which combines the advantages of the afore-described tank and tube heaters while avoiding their shortcomings.

More specifically, the invention aims at providing a water heating apparatus which requires but a small amount of expensive, corrosion resistant material of construction.

Another object is the provision of a water heating apparatus whose continuous-flow capacity is high, and whose peak capacity can be made as high as desired by mere dimensional changes.

A further object is the provision of a water-heating apparatus which automatically prevents or retards the formation of internal mineral coatings of hard water constituents.

With these and other objects in view, the invention in its more specific aspects includes a boiler shell and a thin-walled tank of heat conducting material in the space enclosed by the shell. The tank, which is equipped with means for feeding water to the cavity thereof, and for withdrawing the heated water, has a wall of substantially circular cross section about the tank axis. Two axially spaced closure portions are sealingly connected to the wall. A supporting frame fixedly fastened to the boiler shell includes a plurality of annular members which extend about the tank axis, are axially spaced from each other and receive the afore-mentioned tank wall. The tank is secured to the frame for limited movement relative thereto. A heat transmitting fluid, such as water or steam, in the space of the boiler shell may be heated in a conventional manner to transmit the thermal energy of a heat source to the water in the tank.

Other features and many of the attendant advantages of this invention will be more fully appreciated as the same becomes better understood by reference to the following description of preferred embodiments when considered with the appended drawing in which:

FIG. 1 shows a water heating tank of the invention in side-elevational section, other elements of the heating apparatus being indicated in phantom view;

FIG. 2 shows a portion of a boiler and of a frame for fastening the tank of FIG. 1 to the boiler, the view being in front elevation, and partly in section;

FIG. 3 illustrates the assembly of the tank of FIG. 1 with the boiler and frame of FIG. 2 in fragmentary side elevation;

FIG. 4 shows a modification of the frame of FIG. 2;

FIG. 5 shows the tank of FIG. 1 and boiler of FIG. 2 connected by a modified frame, in side-elevation and partly in section;

FIG. 6 illustrates a variation of the device of FIG. 5 in a corresponding view;

FIG. 7 is a sectional view of the apparatus of FIG. 6 taken on the line VI—VI;

Figure 8:
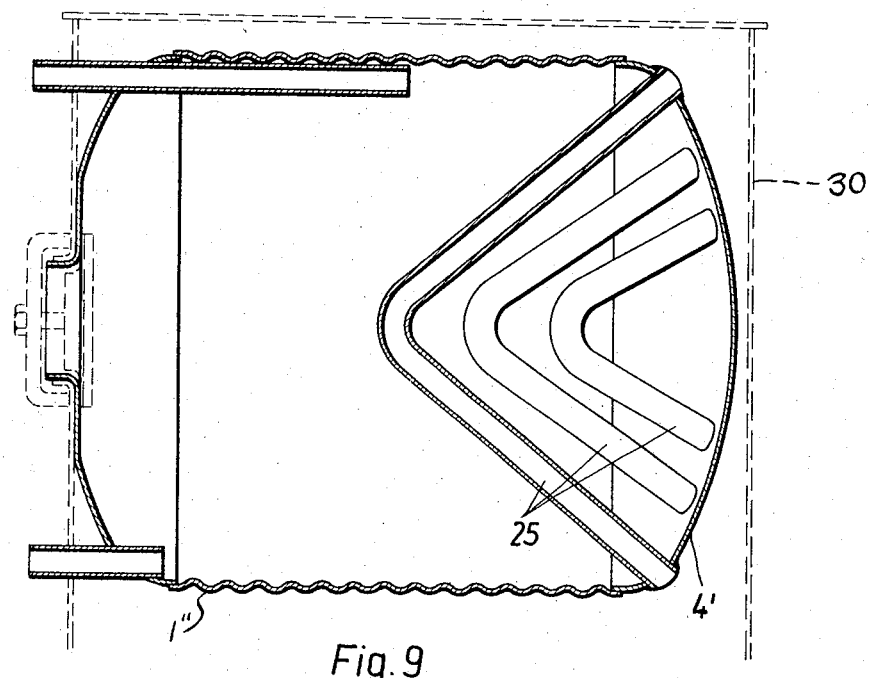
FIG. 8 shows another modified tank in a view corresponding to FIG. 1.

Referring now to the drawing in detail, and initially to FIG. 1, there is seen as much of an otherwise conventional domestic heating boiler as is necessary for an understanding of the invention, only the boiler shell 30, and the combustion chamber 31 of the boiler being visible in partial phantom view.

A water heating tank 1 of copper-nickel alloy having a wall thickness of only 1 to 2 mm. is mounted within the space enclosed by the shell 30 above the combustion chamber chamber 31. The tank 1 is generally cylindrical. One axial wall portion 2 is corrugated, its ridges or ribs circling the tank axis and being axially separated by circular grooves. Another axial wall portion 18 is smoothly cylindrical and carries an external spiral rib 17. Because of the thin wall material, both wall portions are capable of some axial expansion under internal pressure.

The tank 1 is axially closed by dished bottoms 3, 4, the bottom 3 having an elliptic opening 5, normally sealed by a plug 5' accessible from outside the boiler shell 30. The corrugations of the wall portion 2 and the spiral rib 17 stiffen the tank 1 and increase its resistance to radial pressure. The bottoms 3, 4 which provide axial closures for the tank cavity are similarly stiffened by internal ribs 14.

A feed pipe 6 and a discharge pipe 7 pass through the bottom 3 at the lowest and the highest point thereof so that cold water fed to the tank space through the feed pipe 6 rises as it is heated by thermal contact with the hot water or steam in the boiler space, and may be withdrawn through the discharge pipe 7.

As better seen in FIGS. 2 and 3, the tank is mounted within the boiler shell 30 by two supporting plates of which only one is shown in FIGS. 2 and 3, the two plates being axially spaced in the manner shown in FIG. 5 or 6 with reference to modified arrangements. Each supporting plate consists of two portions 8, 9 which are welded to the boiler shell 30 and to each other so as to constitute an approximately square, vertical partition in the shell 30. Each plate portion 8, 9 has a semi-circular edge 10 about a recess in the plate portion, and the plate portions are fastened to each other so as to extend in a closed ring about the full circle of the connected recesses. The edges 10 are covered by corresponding semi-circular gaskets 13 of U-shaped cross section and consisting of heat resistant synthetic elastomer. Four short slots 11 extend in a common circle about the center of the edges 10 through the plate portions 8, 9.

The supporting plates are arranged coaxially to receive the tank 1 in their aligned recesses. As is partly illustrated in FIG. 3, a strap 12 freely passes through each slot 11, and its free ends on either side of the associated plate portion 8 or 9 are welded to axially consecutive ribs 16 on the corrugated wall portion 2, the edge 10 with its gasket 13 being received in the interposed groove.

It will be understood, but has not been illustrated, that the rib 17 is fastened to an associated supporting plate by screws passing through slots 11 and engaging tapped holes in the rib. There is no direct contact between the supporting plate and the smooth cylindrical wall portion 18.

Obviously, the corrugations shown on the wall portion 2 may extend over the full length of the tank 1, or the spiral rib 17 may extend over a smooth cylindrical wall which extends over almost the entire axial length of the tank from one-dished bottom to the other without departing from the above teachings.

It is characteristic of the several modifications of the apparatus shown in FIGS. 1 to 3, that radial stresses in the tank 1 are largely absorbed by the relatively heavy plates 8, 9 which are made of steel, and that the thin copper alloy walls of the tank 1 can yield to internal stresses in an axial direction to a certain extent, compressive stresses are effectively resisted by the ribbed or corrugated wall structure.

The thinness of the tank walls not only reduces the first cost of the relatively expensive alloy material employed but also provides superior heat conductivity and a correspondingly high rate of heat transfer from the surrounding heating fluid to the water in the tank 1, thereby providing high continuous heating capacity.

Galvanic corrosion of the boiler shell 30 or of the supporting frame constituted by the plates 8, 9 is effectively prevented by the gaskets 12 which electrically insulate the copper alloy portion of the structure from the steel portion. It will be appreciated that similar insulating gaskets may be provided where the bottom 3 engages the boiler shell 30, and elsewhere, as needed.

If the boiler is thermostat controlled, as is the rule, the temperature of the steam or hot water in the shell 30 fluctuates, and the tank 1 expands and contracts correspondingly. The hard-water scale which may tend to deposit on the inner wall surfaces of the tank is brittle, and its thermal expansion coefficient is very different from that of the copper alloy. The bond between the scale and the tank walls thus is broken during each heating cycle of the boiler and during each change in the pressure differential between the tank cavity and the boiler space, and the loose scale particles are swept from the tank 1 by the hot water withdrawn through the discharge pipe 7. They can never attain a thickness sufficient to make their presence in the hot water objectionable.

The copper-nickel alloy of the tank 1 has been found to have a practically unlimited service life in the heating apparatus of the invention, and not to accelerate corrosion of other parts of the installation when properly insulated. The tank needs only very infrequent cleaning, and no other maintenance.

The plates 8, 9 not only provide the necessary structural support for the walls of the tank 1 but also strengthen and stiffen the boiler shell 30. The material used in constructing the plates 8, 9 may thus be saved by the use of lighter gauge plates in the boiler shell 30. The supporting plates 8, 9 conform along three of their combined four sides with the shell wall, and are fixedly fastened to the same.

Some of the advantages of the invention are obtained if the plates 8, 9 are not directly welded to the boiler walls to constitute a fixed supporting frame for the tank 1, but are joined by an outer frame 15 separate from the boiler, as shown in FIG. 4. The assembly obtained by installing the tank 1 in the central recess of the plates 8, 9 in the manner shown in FIG. 2 may then be mounted in a heated space in any desired manner.

FIG. 5 shows the afore-mentioned modification 1' of the tank 1 illustrated in FIG. 1, in which the entire cylindrical wall of the tank is corrugated. The tank 1' is mounted in the boiler shell by means of a rigid framework consisting of two axially spaced unitary plates 19 which are connected by four axially elongated straps 21 equiangularly spaced about the tank axis, only two ribs 21 being visible in FIG. 5.

The longitudinal ends of the straps 21 are welded to rings 20, 20' which are spherically curved for conforming engagement with the dished bottoms of the tank 1' but axially spaced apart to permit axial expansion of the tank 1' when its temperature and/or internal pressure increase. The framework is fastened to the boiler shell by welds connecting integral flanges 23 on the rings 20, 20' to the front and rear walls 22 of the boiler shell, and by additional welds connecting the plates 19 to the boiler top wall 24.

The water heating apparatus of the invention shown in FIGS. 6 and 7 differs from that illustrated in FIG. 5 by a reinforcing and supporting frame whose axial straps 21' extend beyond the rings 20, 20' and are directly welded to the front and rear walls 22 of the boiler shell.

The continuous flow capacity of the heating tanks of the invention may be increased by conduits arranged in the tank cavity, the two terminal portions of each conduit being fixedly and sealingly fastened to the same or to different bottoms of the tank, the orifices of the conduits being open to the heating space in the boiler shell, and the conduits being shaped in such a manner that their overall length is greater than the spacing of the two orifices in order to permit the axial expansion and contraction of the tank.

Figure 9:
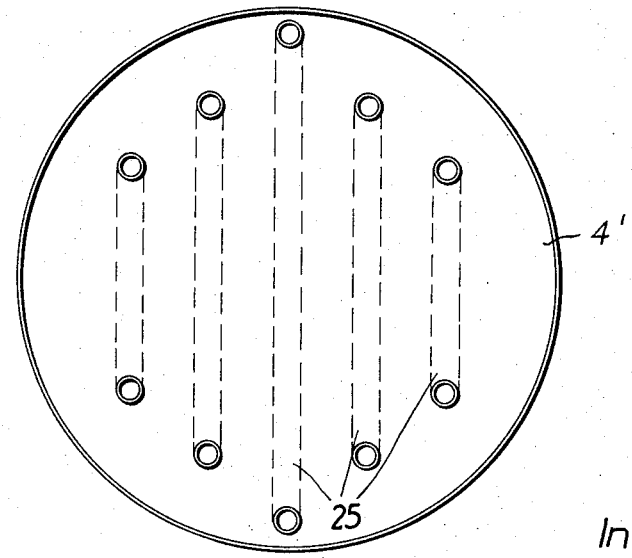
FIG. 9 shows the tank of FIG. 8 in rear view.

Paired openings in the bottom 4' of the tank 1" shown in FIGS. 8 and 9 are sealed by the terminal portions of five outwardly open, V-shaped tubes 25 which increase the effective heat-transfer surface of the tank without affecting the ability of the tank to expand and contract in an axial direction. The tubes 25 contribute to the ability of the tank to resist radial stresses.

The supporting frame and its connections with the tank and the boiler shell 30 have been omitted from the showing of FIGS. 8 and 9. The tank is mounted in the boiler shell 30 in such a manner that the two orifices of each tube 25 are vertically offset from each other.

Figure 10:
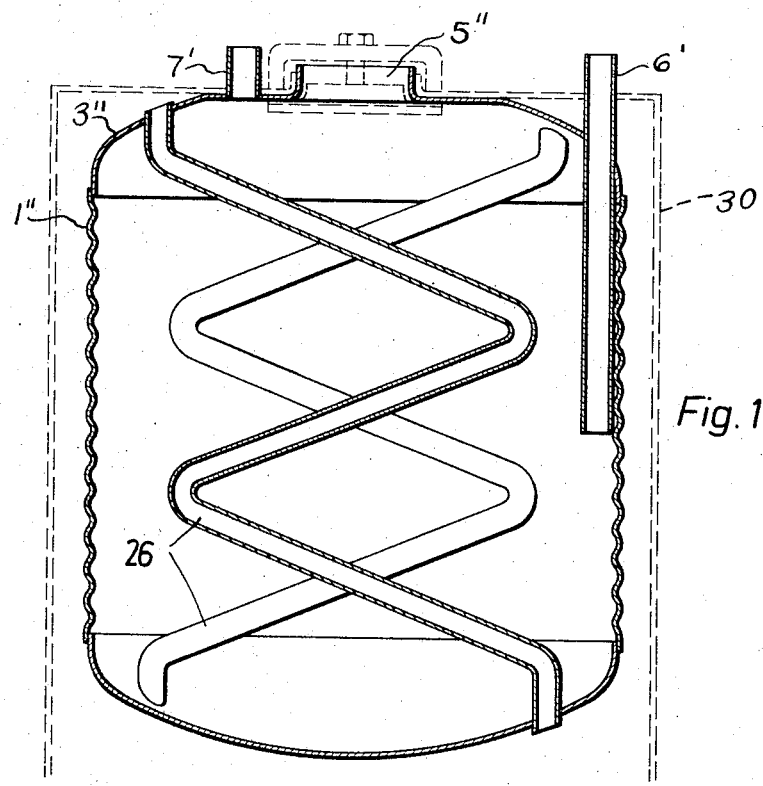
FIG. 10 shows yet another tank in side-elevational section.
Figure 11:
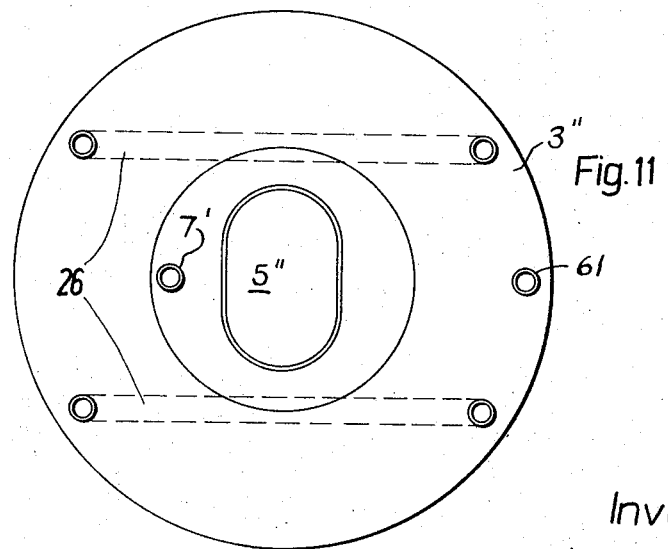
FIG. 11 shows the tank of FIG. 10 in top plan view.

The tank 1" shown in FIGS. 10 and 11 has a vertical axis and is mounted in the boiler shell 30 by a non-illustrated frame in such a manner that its oblong, normally sealed clean-out opening 5" is accessible through the top of the boiler shell 30. The cold-water feed pipe 6' passes downwardly through the boiler top and the upper tank closure 3" to a level below the center of the tank axis. The orifice of the hot-water discharge pipe 7' is in the upper tank closure 3".

Four internal heat-transfer tubes 26 of serpentine shape extend between respective outwardly open orifices thereof in the upper and lower axial tank closures 3", 4" so that the fluid heated in the boiler space by the combustion of a fuel in the combustion chamber, not seen in FIGS. 10 and 11, may flow downwardly through the tubes 26, and transmit its thermal energy to the water in the tank 1".

The angularly joined parts of the heat-transfer tubes 25, 26 move relative to each other when the water temperature in the associated water heating tanks 1″ changes, and thereby tend to shed scale deposits which may form on their inner and outer surfaces from hard water. Similar relative movement takes place in axial tank closures, such as the bottoms 3 and 4 shown in FIGS. 1 and 2, which are provided with ribs 14. It will be appreciated that such ribs may be provided in the tanks 1′, 1″ if so desired. Changes in the fluid-pressure differential between the tank cavity and the boiler space similarly promote shedding of hard water deposits from the tanks of the invention.

The mobility of the tank walls is predicated on their small thickness which in turn is permissible only when a reinforcing and supporting outer framework absorbs or transmits to the boiler shell much of the stress, particularly the radial stress exerted on the tank by the fluids within the same and surrounding the same.

Because of their small wall thickness, the tanks of the invention may be built economically from relatively costly corrosion-resistant alloys, such as the copper-nickel alloy (Monel) specifically referred to. The heat transfer properties of a thin-walled tank are inherently good, and the continuous flow capacity of the tanks of the invention may be further increased by the provision of thin-walled internal tubes made of the same material as the tank itself without sacrificing any of the other advantages.

While the invention has been described more specifically with reference to a boiler shell whose walls are joined at right angles, it will be appreciated that cylindrical or otherwise shaped boiler shells may be equipped with the water-heating tanks of the invention by the use of suitably configurated supporting frameworks including, for example, annular supporting plates whose outer edges are not square.

Many features of the several illustrated embodiments may be combined in an obvious manner. The unitary supporting plates 19, for example, may be provided with slots in the manner shown in FIG. 2, and straps such as the straps 12, may movably pass through such slots and be welded to the corrugated, generally cylindrical wall of the tank 1′ shown in FIGS. 5 to 7. The several reinforcing and supporting frameworks shown in FIGS. 1 to 7 are interchangeably applicable to the tanks 1″ illustrated in FIGS. 8 to 11.

Many other modifications and variations of the present invention are possible in the light of the above teachings. It is therefore to be understood that, within the scope of the appended claims, the invention may be practiced otherwise than as specifically disclosed.

What is claimed is:

1. A water heating apparatus comprising, in combination:
   (a) a shell enclosing a space;
   (b) a thin-walled tank of heat-conducting material in said space,
      (1) said tank having an axis, a wall of substantially circular cross section about said axis and two axially spaced closure portions sealingly connected to said wall, said wall and said closure portions jointly enclosing a cavity in said tank,
      (2) said wall being formed with a plurality of ribs circumferentially elongated about said axis;
   (c) feed means for continuously feeding water to be heated to said cavity;
   (d) discharge means for continuously withdrawing the heated water from said cavity;
   (e) supporting frame means including a plurality of annular members extending about said axis and axially spaced from each other,
      (1) said wall being received in said annular members;
   (f) securing means securing said tank to said frame means for limited movement relative thereto;
   (g) fastening means fixedly fastening said frame means to said shell; and
   (h) heating means for heating a heat-transmitting fluid in said space.

2. An apparatus as set forth in claim 1, wherein said frame means further include a plurality of axially elongated, circumferentially spaced connecting members, each connecting member being fixedly fastened to said annular members.

3. An apparatus as set forth in claim 1, wherein said securing means include a plurality of securing elements, each element engaging one of said ribs and one of said annular members.

4. An apparatus as set forth in claim 1, wherein said closure portions are formed with respective integral annular ribs about said axis.

5. An apparatus as set forth in claim 1, wherein said ribs are axially spaced from each other to define grooves therebetween on the external face of said wall, each annular member including two plate-shaped portions, each formed with an arcuate recess and having an edge bounding said recess said plate-shaped portions being secured to each other about said wall, said edges engaging one of said grooves.

6. An apparatus as set forth in claim 5, further comprising electrical insulating means interposed between said edges and said wall in said groove.

7. An apparatus as set forth in claim 1, wherein said annular members are formed with a plurality of axial openings therethrough, said securing means including a plurality of strap members, each strap member being received in a corresponding one of said openings and having two axially spaced terminal portions fixedly fastened to said wall.

8. An apparatus as set forth in claim 1, wherein said annular members substantially conformingly engage said shell.

9. An apparatus as set forth in claim 1, wherein one of said closure portions is dished, and said frame means further include a ring member substantially conforming to said one closure portion and axially juxtaposed thereto.

10 An apparatus as set forth in claim 9, wherein said ring member is normally axially spaced from said one closure portion a distance sufficient to permit expansion of said tank.

11. An apparatus as set forth in claim 1, wherein said frame means include a plurality of axially elongated, circumferentially spaced connecting members, each connecting member being fixedly fastened to said annular members, and at least one of said connecting members having a terminal portion fixed fastened to said shell.

12. An apparatus as set forth in claim 1, further comprising an elongated conduit in said cavity, respective terminal portions of said conduit defining orifices thereof, each of said terminal portions being fixedly fastened to one of said closure portions to seal said orifices from said cavity, the orifices communicating with said space, the length of said conduit between said orifices being substantially greater than the spacing of said orifices.

References Cited

UNITED STATES PATENTS

| 541,934 | 7/1895 | Korsmeyer | 122—233 |
| 2,739,576 | 3/1956 | Ricardo | 122—233 X |
| 3,028,843 | 4/1962 | Carlson et al. | 122—494 X |

FOREIGN PATENTS

| 242,481 | 1/1963 | Australia. |

CHARLES J. MYHRE, *Primary Examiner.*